(12) United States Patent
An et al.

(10) Patent No.: US 10,996,068 B2
(45) Date of Patent: May 4, 2021

(54) VEHICLE AND VEHICLE SYSTEM

(71) Applicants: Hyundai Motor Company, Seoul (KR); Kia Motors Corporation, Seoul (KR)

(72) Inventors: Daeyun An, Whasung-si (KR); Dong-Seon Chang, Whasung-si (KR); Seunghyun Woo, Whasung-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 29 days.

(21) Appl. No.: 16/211,012

(22) Filed: Dec. 5, 2018

(65) Prior Publication Data

US 2020/0072630 A1     Mar. 5, 2020

(30) Foreign Application Priority Data

Sep. 3, 2018   (KR) .................. 10-2018-0104622

(51) Int. Cl.
| | |
|---|---|
| *B60W 40/09* | (2012.01) |
| *G01C 21/34* | (2006.01) |
| *G06K 9/00* | (2006.01) |
| *G01C 21/36* | (2006.01) |

(52) U.S. Cl.
CPC ......... *G01C 21/3484* (2013.01); *B60W 40/09* (2013.01); *G01C 21/3691* (2013.01); *G06K 9/00845* (2013.01)

(58) Field of Classification Search
CPC ............ G01C 21/3484; G01C 21/3691; G06K 9/00845; B60W 40/09
See application file for complete search history.

(56) References Cited

U.S. PATENT DOCUMENTS

| | | | |
|---|---|---|---|
| 10,322,727 B1* | 6/2019 | Chan ..................... | B60W 50/14 |
| 10,527,441 B2* | 1/2020 | Colby ................ | G01C 21/3484 |
| 2015/0260531 A1* | 9/2015 | Ehsani ............... | G01C 21/3461 |
| | | | 701/538 |
| 2018/0281807 A1* | 10/2018 | Minegishi .......... | G06K 9/00845 |

* cited by examiner

*Primary Examiner* — Peter D Nolan
*Assistant Examiner* — Ashley L Redhead, Jr.
(74) *Attorney, Agent, or Firm* — Morgan, Lewis & Bockius LLP

(57) ABSTRACT

A vehicle may include a display, a sensor configured to detect state information related to a user and the vehicle, a communicator configured to receive travelling information related to the vehicle corresponding to the state information from an external server; and a controller configured to classify drivers having a same tendency as the user on the basis of the travelling information, generate a travel route of the vehicle on the basis of an emotion state of the user and information related to the classified drivers, and display the generated travel route on the display.

14 Claims, 12 Drawing Sheets

<GANGNAM BANG-BANG INTERSECTION,
WEEKDAY 12AM TO 10PM INFORMATION → EMOTION OF ANGER>

<FREEDOM AVENUE, WEEKDAY 09PM TO 12PM INFORMATION
→ EMOTION OF PLEASURE>

<UIWANG RESEARCH INSTITUTE,
WEEKDAY 09PM TO 12PM INFORMATION → EMOTION OF WEARINESS>

FIG. 6

| EMOTION | | REFERENCE PLACE /CONDITION | | | | MAIN CIRCUMSTANTIAL FACTOR | | | | | |
|---|---|---|---|---|---|---|---|---|---|---|---|
| | | PLACE | DAY | TIME | GSP | TRAFFIC CONDITION | ACCELERATION INFORMATION | TRAFFIC LIGHT | WEATHER | AVN | |
| ANGRY | | GANGNAM INTERSECTION | SATURDAY | 14:00 | xxxx | HEAVY TRAFFIC JAM | 5km/h | CLEAR | CLEAR | FUN MUSIC | ... → A DRIVE |
| EMOTION | | PLACE | DAY | TIME | GSP | TRAFFIC CONDITION | ACCELERATION INFORMATION | TRAFFIC LIGHT | WEATHER | AVN | |
| ANGRY | | GANGNAM INTERSECTION | SATURDAY | 16:00 | xxxx | HEAVY TRAFFIC JAM | 3km/h | CLEAR | CLOUDY | SOFT MUSIC | ... → B DRIVE |
| EMOTION | | PLACE | DAY | TIME | GSP | TRAFFIC CONDITION | ACCELERATION INFORMATION | TRAFFIC LIGHT | WEATHER | AVN | |
| ANGRY | | GANGNAM INTERSECTION | SATURDAY | 18:00 | xxxx | HEAVY TRAFFIC JAM | 2km/h | CLEAR | CLOUDY | ROCK | ... → C DRIVE |
| EMOTION | | PLACE | DAY | TIME | GSP | TRAFFIC CONDITION | ACCELERATION INFORMATION | TRAFFIC LIGHT | WEATHER | AVN | |
| HAPPY | | GANGNAM INTERSECTION | SATURDAY | 02:00 | xxxx | GOOD | 50km/h | CLEAR | RAINY | x | ... → D DRIVE |

CLASSIFICATION OF THE SAME TENDENCY AS THE USER: { A DRIVE, B DRIVE, C DRIVE }

FIG. 7

| EMOTION | DAY | TIME | PLACE | TRAFFIC CONDITION | ACCELERATION INFORMATION |
|---|---|---|---|---|---|
| ANGRY | SATURDAY | 14:00 | GANGNAM INTERSECTION | HEAVY TRAFFIC JAM | 5km/h |

<CURRENT EMOTION OF DRIVER>

| EMOTION | DAY | TIME | PLACE | TRAFFIC CONDITION | ACCELERATION INFORMATION |
|---|---|---|---|---|---|
| HAPPY | SATURDAY | 14:00 | NEARBY EXPRESSWAY | SLOW | 25km/h |

<RECOMMENDED ROUTE>

VEHICLE AND VEHICLE SYSTEM

CROSS-REFERENCE TO RELATED APPLICATION

The present application claims priority to Korean Patent Application No. 10-2018-0104622, filed on Sep. 3, 2018 in the Korean Intellectual Property Office, the entire contents of which is incorporated herein for all purposes by this reference.

BACKGROUND OF THE INVENTION

Field of the Invention

The present invention relates to a vehicle system including a vehicle and a server, and more specifically to a technique for generating a travel route on the basis of an emotion state of a driver and travelling information related to a vehicle.

Description of Related Art

In modern society, vehicles are the most common means of transportation and the number of people using vehicles is increasing. With the development of vehicle technology, a number of changes have occurred in life, such as easy movement of long distance and convenience in life.

However, as the number of vehicles increases rapidly, traffic congestion becomes a growing issue, and a navigation function comes into wide use as a solution to the traffic congestion.

A navigation device is designed to identify the current position of a user by receiving signals regarding the current position of the user from a plurality of Global Positioning System (GPS) satellites located above the earth, identify the current traffic situation, and inform the user of the shortest travel route to the destination. Aside from the above described feature, the navigation device also serves to provide the user with various pieces of service information required for navigation in association with a map (the current position and speed of a moving object, the distance and route to the destination, detailed information related to the destination, and the like).

However, in the conventional technology for determining and providing an optimal route between a starting point and a destination, the route is determined only considering a starting point, a destination, and road traffic information, rather than considering emotion information related to the driver.

Recently, there has been development of technologies for increasing the convenience of a driver in consideration of emotional aspects of the driver of the vehicle. In this regard, there are technologies for changing the environment in the vehicle according to the driver's emotions, but detailed methods of determining a recommended route on the basis of emotion information related to a driver and emotion information related to other drivers with respect to a route have not been developed so far.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle configured for providing a user with a travel route generated on the basis of a current emotion of a user and travelling information related to a vehicle, and a vehicle system thereof.

Additional aspects of the present invention will be set forth in portion in the description which follows and, in part, will be obvious from the description, or may be learned by practice of the present invention.

Various aspects of the present invention are directed to providing a vehicle including: a sensor configured to sense state information related to a user and a vehicle; a communicator configured to receive travelling information related to the vehicle corresponding to the state information from an external server; and a controller configured to classify drivers having a same tendency as the user on the basis of the travelling information, and control at least one device provided in the vehicle on the basis of an emotion state of the user and information related to the classified drivers to change the emotion state of the user.

The vehicle may further include a display, wherein the controller may be configured to generate a travel route of the vehicle to improve the emotion state of the user, and displays the generated travel route on the display.

The controller may be configured to control at least one of an audio, video, navigation (AVN) device, an air conditioning device, a vehicle sheet, and a window that are provided in the vehicle.

The controller may classify the drivers having the same tendency as the user on the basis of the travelling information according to a predetermined criterion.

The predetermined criterion may include at least one of a time, a day of a week, a date, a season, a weather, and a current location of the vehicle.

The controller may classify drivers who have a same emotion as the user in a same place on the basis of the travelling information, as the drivers who have the same tendency as the user.

The controller may extract at least one factor that exerts influence on emotions of the drivers on the basis of the information related to the drivers, and may generate the travel route on the basis of the at least one factor.

The at least one factor may include at least one of a traffic situation of a road being travelled by the vehicle, a type of the road, and a travelling speed of the vehicle.

The vehicle may further include an inputter configured to directly receive an emotion state of the user from the user.

The inputter may receive an input of the emotion state of the user through at least one of a text, a speech, and an emoticon.

Various aspects of the present invention are directed to providing a vehicle system including a vehicle that may include: a display configured to display a travel route of the vehicle; a sensor configured to detect state information related to a user and the vehicle; and a communicator configured to transmit the state information to a server, and the server configured to classify drivers having a same tendency as the user on the basis of travelling information received from the vehicle, generate a travel route of the vehicle on the basis of an emotion state of the user and information related to the classified drivers, and transmit the generated travel route to the vehicle.

The server may classify the drivers having the same tendency as the user on the basis of the state information according to a predetermined criterion.

The predetermined criterion may include at least one of a time, a day of a week, a date, a season, a weather, and a current location of the vehicle.

The server may classify drivers who have a same emotion as the user in a same place on the basis of the state information, as the drivers who have the same tendency as the user.

The server may extract at least one factor that exerts influence on emotions of the drivers on the basis of the information related to the drivers, and may generate the travel route on the basis of the at least one factor.

The at least one factor may include at least one of a traffic situation of a road being travelled by the vehicle, a type of the road, and a travelling speed of the vehicle.

The server may generate the travel route with a direction for removing the at least one factor.

The server may generate the travel route toward a direction for changing a current emotion state of the user.

The vehicle may further include an inputter configured to directly receive an input of an emotion state of the user from the user.

The inputter may receive an input of the emotion state of the user through at least one of a text, a speech, and an emoticon.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A, FIG. 5B, FIG. 5C and FIG. 6 are diagrams illustrating a method of extracting factors exerting influencing on emotions of drivers having the same emotion according to an exemplary embodiment of the present invention;

FIG. 7 is a diagram illustrating information related to a travel route generated on the basis of a current emotion state of a driver according to an exemplary embodiment of the present invention.

Figure 1:
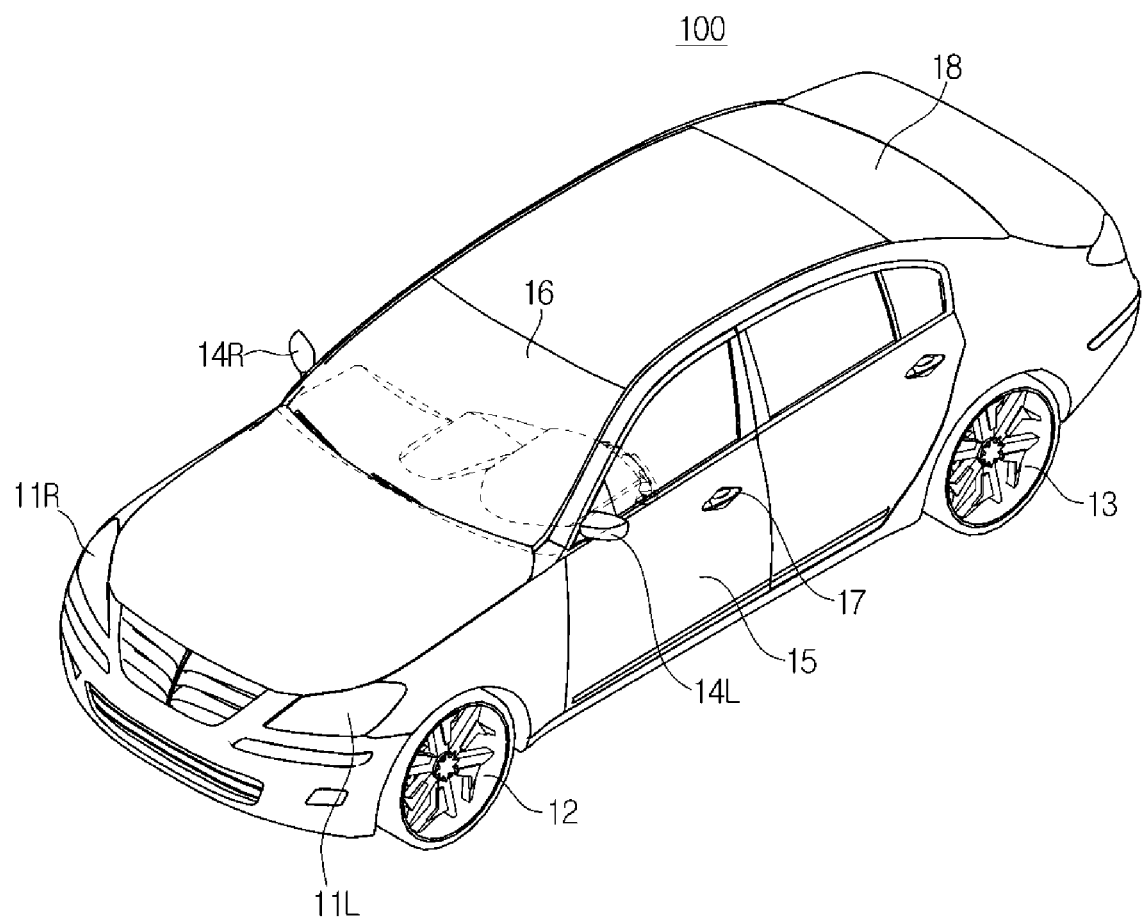
FIG. 1 is an external view exemplarily illustrating an external appearance of a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The exemplary embodiments set forth herein and illustrated in the configuration of the present invention are only the most exemplary embodiments and are not representative of the full the technical spirit of the present invention, so it may be understood that they may be replaced with various equivalents and modifications at the time of the disclosure.

The terminology used herein is for describing various exemplary embodiments only and is not intended to be limiting of the disclosure. As used herein, the singular forms "a," "an" and "the" are intended to include the plural forms as well, unless the context clearly indicates otherwise.

It will be further understood that the terms "comprises," "comprising," "may include" and/or "including," when used herein, specify the presence of stated features, integers, steps, operations, elements, and/or components, but do not preclude the presence or addition of one or more other features, integers, steps, operations, elements, components, and/or groups thereof. Although the terms "first," "second," "A," "B," etc. may be used to describe various components, the terms do not limit the corresponding components, but are used only for distinguishing one component from another component.

Figure 2:
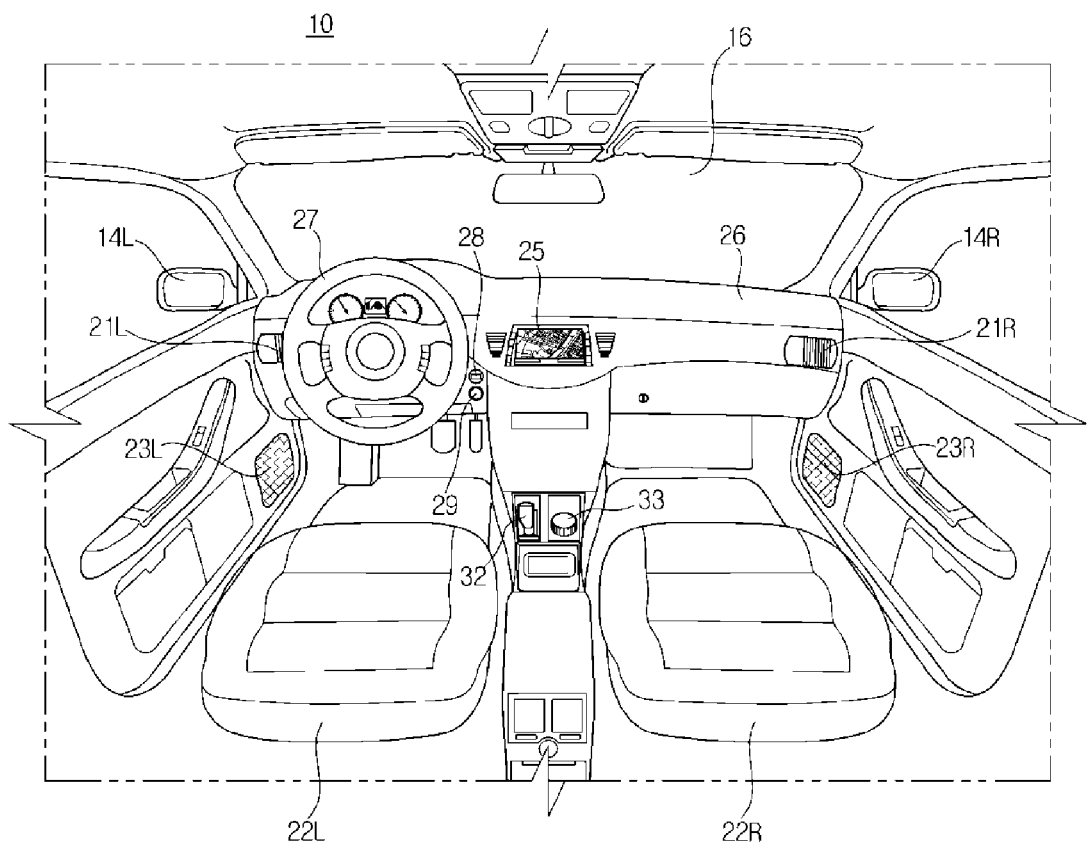
FIG. 2 is an internal view exemplarily illustrating an internal appearance of a vehicle according to an exemplary embodiment of the present invention.

Hereinafter, the exemplary embodiment of the present invention will be described with reference to the accompanying drawings. Furthermore, parts irrelevant to description are omitted in the drawings to clearly explain exemplary embodiments. FIG. 1 is an external view exemplarily illustrating an external appearance of a vehicle according to an exemplary embodiment of the present invention, and FIG. 2 is an internal view exemplarily illustrating an internal appearance of a vehicle according to an exemplary embodiment of the present invention. The following description will be made with reference to FIG. 1 and FIG. 2 in conjunction with each other to avoid redundancy of description.

Referring to FIG. 1, the external appearance of a vehicle 100 according to an exemplary embodiment includes wheels 12 and 13 for moving the vehicle 100, doors 15 for shielding the internal to the vehicle 100 from the outside, a front glass 16 for providing a user within the vehicle 100 with a front view of the vehicle 100, and side mirrors 14L and 14R for providing the user with a rear view of the vehicle 100.

The wheels 12 and 13 include a front wheel 12 provided at the front of the vehicle 100 and a rear wheel 13 provided at the rear of the vehicle 100. A driving device provided within the vehicle 100 may provide the front wheel 12 or the rear wheel 13 with a rotational force for the vehicle 100 to move forward or backward thereof. Such a driving device may employ an engine that generates a rotational force by burning fossil fuel, or a motor that generates a rotational force by receiving power from a capacitor.

The doors 15 are rotatably mounted on the left and right sides of the vehicle 100 such that the user or the passenger may ride in the vehicle 100 when the doors 15 are opened, and the internal to the vehicle 100 is shielded from the outside thereof when the doors 15 are closed. Furthermore, a knob 17 for opening or closing the door 15 may be provided at an external portion of the vehicle 100.

The front glass 16 is mounted on the front upper side of a main vehicle body 100 such that a user within the vehicle 100 may obtain visual information related to the front of the vehicle 100.

Furthermore, the side mirrors 14L and 14R include a left side mirror 14L mounted on the left side of the vehicle 100 and a right side mirror 14R mounted on the right side of the vehicle 100 such that the user obtains visual information related to lateral sides and the rear of the vehicle.

Furthermore, a headlamp 11 for securing a field of view directed forward of the vehicle 100 may be provided at the left side and the right side of the vehicle 100 as a left headlamp 11L and a right head lamp 11R, respectively.

Furthermore, the vehicle 100 may include a sensor that detects obstacles or other vehicles on the rear or the lateral side of the vehicle 100. The sensor may include a detecting device, such as a proximity sensor, a rain sensor for detecting rainfall and the amount of rainfall, and the like.

The proximity sensor may transmit a detection signal at the lateral side or rear of the vehicle 100, and may receive a reflection signal reflected from an obstacle, such as another vehicle. The presence or absence of an obstacle on the lateral side or rear of the vehicle 100 may be detected and the position of the obstacle may be detected on the basis of the waveform of the received reflection signal. An example of such a proximity sensor may employ a method of transmitting ultrasound waves or infrared rays to an obstacle and detecting a distance to the obstacle using ultrasound waves or infrared rays reflected by the obstacle.

Referring to FIG. 2, an Audio, Video, Navigation (AVN) including a navigation device 25 for displaying various videos or images in addition to travelling information related to the vehicle 100 may be provided in a central area of a dashboard 29.

The navigation device 25 is configured to provide the user with a route to a destination, or provide the user with map information regarding a specific location. Devices that perform such a function are referred to as navigation devices, but may also be referred to as various other terms by those of ordinary skill in the art.

Accordingly, the navigation device 25 may include a display for displaying various images and videos including the travelling information related to the vehicle 100.

Furthermore, a center inputter 33 of a jog shuttle type may be provided between a driver seat 22L and a passenger seat 22R. The user may input a control command by rotating the center inputter 33, pressing the center inputter 33, or pushing the center inputter 33, in the upper, lower, left, or right directions.

The vehicle 100 may be provided with a speaker 15 for outputting sound.

The speaker 15 may output sound required to perform an audio function, a video function, a navigation function, and other additional functions.

In FIG. 2, the speaker 15 is illustrated as two speaks 15L and 15R provided at the driver seat 22L and the passenger seat 22R. However, the position of the speaker 15 is not limited thereto and the speaker 15 may be provided at various positions in the vehicle.

A dashboard 26 is provided with a steering wheel 27 at a side facing the driver seat 22L, and is provided at an area adjacent to the steering wheel 27 with a key groove 28 into which a remote control device, such as a FOB key, is inserted. When a remote control device configured for turning on/off the ignition of the vehicle 100 is inserted into the key groove 28, or an authentication between a remote control device and the vehicle 100 is completed via a wireless communication network, the vehicle 100 is connected to an external terminal.

Furthermore, the dash board 26 is provided with an ignition button for controlling on/off of the ignition of the vehicle 100. In a state in which a remote control device configured for controlling the vehicle 100 is inserted into the key groove 28, or an authentication between an external terminal and the vehicle 100 succeeds via a wireless communication network, when the ignition button 29 is pressed by the user, the ignition of the vehicle 100 may be turned on.

Meanwhile, the vehicle 100 is provided with an air conditioner to perform both heating and cooling, and the temperature within the vehicle 100 is controlled by discharging the heated or cooled air through an air vent 21.

In FIG. 2, the air bent 21 is illustrated as two air bents 21L and 21R provided at the driver seat 22L and the passenger seat 22R, respectively. However, the position of the air bent is not limited thereto, the air bent may be provided in various positions inside the vehicle.

Figure 3:
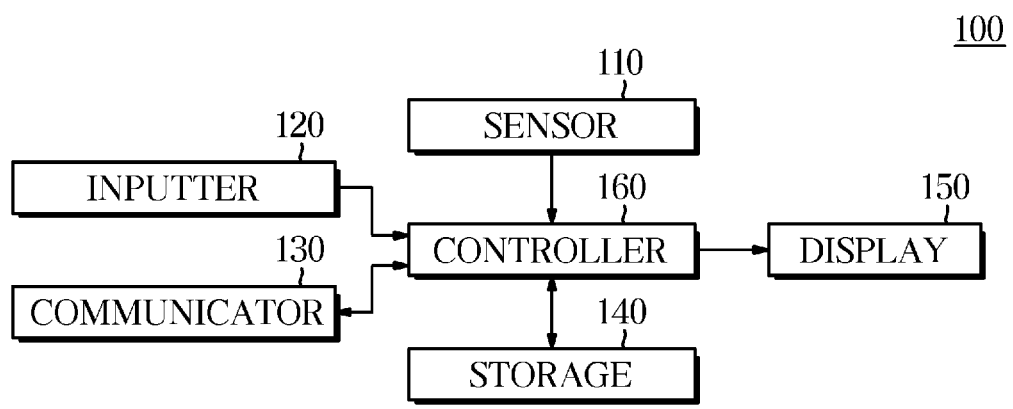
FIG. 3 is a block diagram illustrating a configuration of a vehicle according to an exemplary embodiment of the present invention.

FIG. 3 is a block diagram illustrating a configuration of the vehicle 10 according to an exemplary embodiment of the present invention, and FIG. 4 is a view exemplarily illustrating a method in which an inputter 120 directly receives an emotion from a user according to an exemplary embodiment of the present invention.

Referring to FIG. 3, the vehicle 100 according to an embodiment of the present invention includes a sensor 110 for detecting and acquiring information related to a user, an inputter 120 for receiving information related to the user, a communicator 130 for receiving travelling information and traffic information related to the vehicle 100 from an external server, a storage 140 for storing information related to the vehicle 100, a display 150 for displaying travelling information and a travel route of the vehicle 100, and a controller 160 for generating a travel route on the basis of the received travelling information and traffic information.

The sensor 110 may detect an emotion state of the user, internal information related to the vehicle 100, and external information related to the vehicle 100 in real time, and transmit a result of the detecting to the controller 160.

Information related to a user may include information related to a current emotion state of the user, in detail, various emotion states of the user, for example, anger, sadness, boredom, pleasure, irritation, weariness, and the like. The types of emotions are not limited thereto, and may include various other emotions that a person may feel.

Accordingly, the sensor 110 may include various sensors for detecting and acquiring user's emotions. For example, the sensor 110 may include a face detecting device, an eyeball detecting device, a device configured for detecting a change in heart rate, and sensors for detecting a speech and a behavior of the user, and may determine the emotion state of the user on the basis of the information acquired by the sensor.

Information related to the vehicle 100 may include vehicle information, vehicle internal information, and vehicle external information.

The vehicle information may include information related to a state of the vehicle and information indicating whether the functions operate.

In detail, the vehicle information may include information related to the speed, acceleration, and deceleration of the vehicle 100, information related to the operation and pressure of accelerator/brake pedals, information related to the seat position, information related to the operation state of heat wire/ventilation functions, information related to an operation of an air conditioning system, information related to the indoor brightness, information related to the indoor fine dust level, and information related to the window opening or closing state, and the like.

The vehicle internal information may represent information related to a behavior which is shown by the user or passenger in the vehicle 100. In detail, the vehicle internal information may include information related to whether a passenger is present, information related to a state of conversation, information related to a multimedia device operates, and information related to the type of contents when a multimedia device operates.

The vehicle external information may include all types of external information related to the driving of the vehicle 100.

In detail, the vehicle external information may include current time information, current location information, traffic situation information related to a road travelled by the vehicle 100, road information, weather information, and information related to an outdoor event that occurs on a travel route of the vehicle 100. The traffic situation information may include information indicating whether the flow of traffic is smooth or is in congestion, and the road information may include information related to a traffic light, a crosswalk, a type and form of the road, and a speed limit of the road. The inputter 120 may receive information related to the user and emotion information from the user.

The information related to the user may include information related to the user's body, including at least one of information related to sex, age, weight, and height, and such information may be input directly from the user.

The emotion information may include information related to the emotion that the user is currently feeling. Accordingly, the user may directly input his or her emotion state, for example, anger, sadness, boredom, pleasure, and the like through the inputter 120.

The user may directly input his or her emotion by speech or may input his or her emotion using texts or emoticons.

Figure 4A:
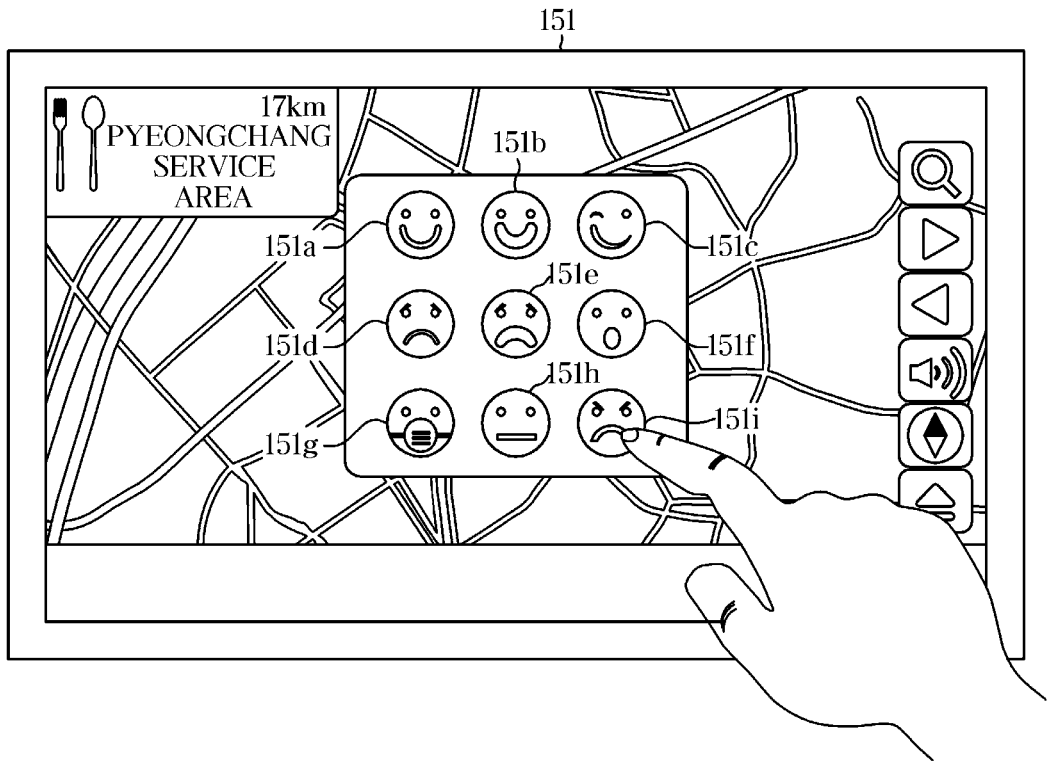
FIG. 4A and FIG. 4B are views exemplarily illustrating a method in which an inputter directly receives an emotion from a user according to an exemplary embodiment of the present invention.
Figure 4B:
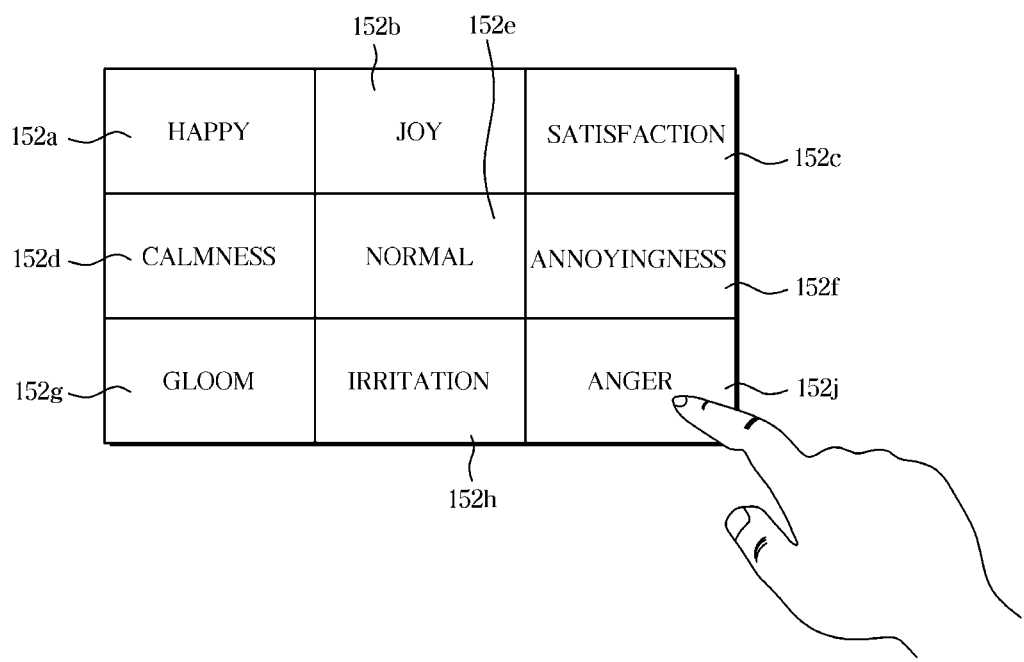

For example, the current emotion of the user may be input by selecting one of o+B43f emoticons 151a to 151i displayed on the display 140 as shown in FIG. 4A, the current emotion of the user may be input by selecting one of items 152a to 152i displayed on the display 140 as shown in FIG. 4B. Although FIG. 4 is illustrated as selecting one of a plurality of emotions the present invention is not limited thereto, and a plurality of emotions may be simultaneously selected.

The communicator 130 may transmit and receive the travelling information and the traffic information related to the vehicle 100 with the external server.

In detail, the communicator 130 may transmit information related to the user and the vehicle 100 detected by the sensor 110 and information related to the user received through the inputter 120 to the external server, and may receive travelling information related to the vehicle 100 corresponding to the transmitted information.

The travelling information related to the vehicle 100 represents information corresponding to the information related to the user and the vehicle 100 transmitted by the communicator 130, and includes information related to a road on which the vehicle 100 is currently travelling, and information related to emotions felt by other drivers on the road on which the vehicle 100 is currently travelling.

Accordingly, the communicator 130 may perform communication with an external server using various methods. Various communication methods, such as Radio Frequency (RF), Wireless Fidelity (WiFi), Bluetooth, Zigbee, near field communication (NFC), Ultra-Wide Band (UWB), and the like may be used to transmit and receive information to or from an external server. A method of performing communication with an external server is not limited thereto, and may be implemented in other methods as long as it can communicate with an external server.

Although the communicator 130 is illustrated as a single component for transmitting and receiving signals in FIG. 4, the present invention is not limited thereto. For example, a transmitter for transmitting signals and a receiver for receiving signals may be separately provided.

Although the sensor 110 and the communicator 130 are illustrated as separate components in FIG. 4, the sensor 110 may further serve as the communicator 130, or the communicator 130 may further serve as the sensor 110.

The storage 140 may store various types of information related to the vehicle 100.

The storage 140 may store basic information related to various mechanisms and devices provided in the vehicle 100, and may also store information acquired by the sensor 110 and the inputter 120. The controller 160 may generate a travel route on the basis of the information stored in the storage 140.

Accordingly, the storage 140 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage 140 is not limited thereto. The storage 140 may be a memory implemented as a chip separated from the processor, which will be described below in connection with the controller 160, or may be implemented as a single chip integrated with the processor.

The display 150 may display various pieces of information including the travelling information and the travel route of the vehicle, and a screen displaying the information may be controlled by the controller 150.

Accordingly, the display 150 may include a display panel for representing such various pieces of information. The display panel may include a cathode ray tube (CRT) display panel, a liquid crystal display (LCD) panel, a light emitting diode (LED) panel, an organic light emitting diode (OLED) panel, a plasma display panel (PDP), a field emission display (FED) panel, and the like.

The display 150 may be implemented as a touch screen that receives a user's input through a touch, and in the instant case, the display 150 may include a display panel for displaying an image and a touch panel for receiving a touch input.

The controller 160 may control various devices provided in the vehicle 100, generate a travel route of the vehicle 100, and display the generated route on the display 150.

The controller 160 may generate a travel route of the vehicle 100 to improve the emotion state of the user and display the generated travel route on the display 150, or may control at least one of the AVN device, the air conditioner, the vehicle seat, and the windows.

For example, the controller 160 may control the genre or volume of the music played in the vehicle 100 or may control other multimedia devices to improve the emotion state of the user. Furthermore, the controller 160 may control the air conditioner or the windows to improve the emotion state of the user.

In detail, the controller 160 classifies drivers having the same tendency as the user on the basis of the travelling information received through the communicator 120, generates a travel route of the vehicle on the basis of an emotion state of the user and information related to the classified drivers, and display the generated travel route on the display 150.

In detail, the controller 160 classifies drivers having the same tendency as the user on the basis of travelling information received through the 120, generates a travel route of the vehicle 100 on the basis of the emotion state of the user and information related to the classified drivers, and displays the generated travel route on the display 150.

In detail, the controller 150 may classify drivers having the same tendency as the user on the basis of the travelling information including about information related to other drivers, which is received from the external server, according to a predetermined criterion, and may generate a travel route on the basis of the classified drivers. That is, the controller 160 may group drivers by the same tendency as the user, and generate a travel route configured for improving the emotion of the user on the basis of information related to the grouped drivers. The predetermined criterion may include at least one of a time, a day of a week, a date, a season, a weather, and a current location of the vehicle 100.

According an exemplary embodiment of the present invention, the controller 160 may classify drivers having the same emotions as the user in the same place, and extract factors that exert influence on the emotions of the drivers. Details thereof will be further described below with reference to FIG. 5A, FIG. 5B, and FIG. 5C.

Figure 5A:
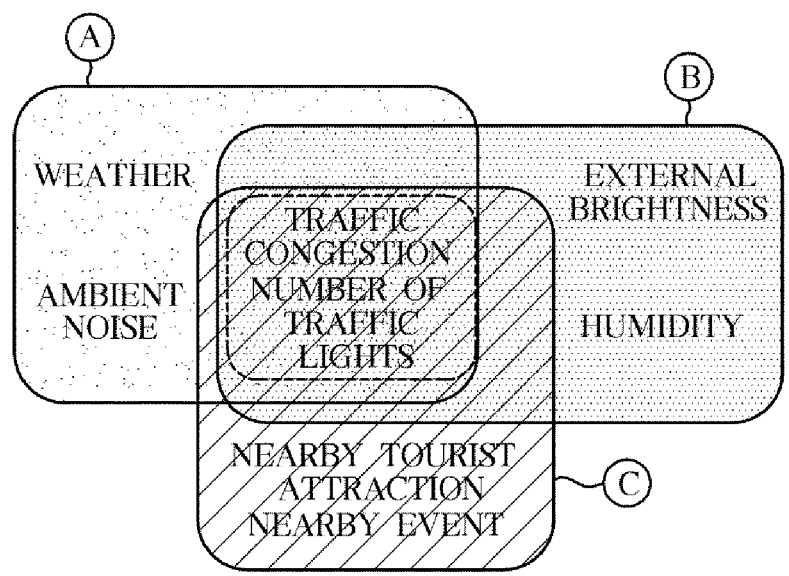
Figure 5B:
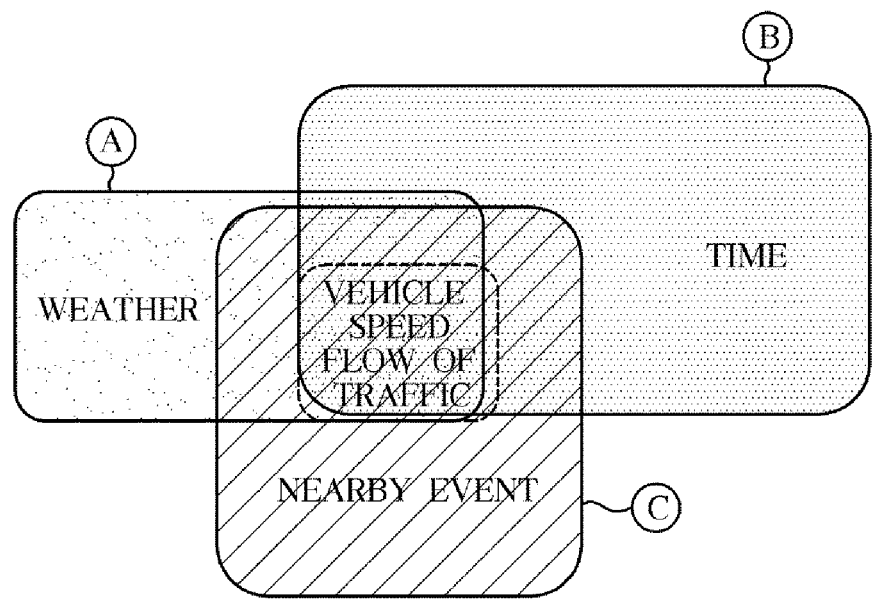

FIG. 5A and FIG. 5B are diagram illustrating a method of extracting factors exerting influence on the emotions of drivers. FIG. 5A is a diagram illustrating factors that exerts influence on the emotions of three drivers who have felt anger between 12 am to 10 pm in the same place, named Bang-Bang intersection.

Referring to FIG. 5A, driver a has felt anger in Bang-Bang intersection between 12 am to 10 pm on a weekday, and in the instant case, weather, ambient noise, traffic congestion and the number of traffic lights serve as main factors that have caused anger to driver a.

Driver b has felt anger in Bang-Bang intersection between 12 am to 10 pm on a weekday, and in the instant case, outdoor brightness, humidity, traffic congestion, and the number of traffic lights serve as main factors that have caused anger to driver b.

Driver c has felt anger in Bang-Bang intersection between 12 am to 10 pm on a weekday, and in the instant case, a nearby tourist attraction, a nearby event, traffic congestion, and the number of traffic lights serve as main factors that have caused anger to driver c.

Accordingly, the controller 160 determines that the traffic congestion and the number of traffic lights are main factors of anger caused to the drivers in Bang-Bang intersection between 12 am to 10 pm on a weekday in common.

FIG. 5B is a diagram illustrating factors that exert influence on the emotions of three drivers who have felt pleasure between 9 pm to 12 pm in the same place, named Freedom Avenue.

Referring to FIG. 5B, driver a has felt pleasure in Freedom Avenue between 9 pm to 12 pm on a weekday, and in the instant case, weather, vehicle speed, and flow of traffic serve as main factors that have caused the pleasure to driver a.

Driver b has felt pleasure in Freedom Avenue between 9 pm to 12 pm on a weekday, and in the instant case, time, vehicle speed, and flow of traffic serve as main factors that have caused the pleasure to driver b.

Driver c has felt pleasure in Freedom Avenue between 9 pm to 12 pm on a weekday, and in the instant case, nearby event, vehicle speed, and flow of traffic serve as main factors that have caused the pleasure to driver c.

Accordingly, the controller 160 determines that the vehicle speed and the flow of traffic are main factors of the pleasure caused to the drivers in Freedom Avenue between 9 pm to 12 pm on a weekday in common.

Figure 5C:
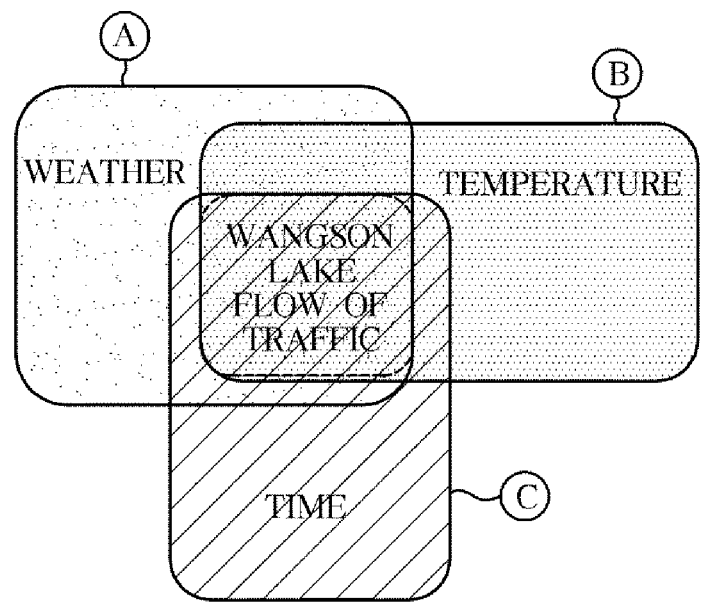

FIG. 5C is a diagram illustrating factors that exert influence on the emotions of three drivers who have felt weariness between 9 pm to 12 pm in a place, named the Uiwang research institute.

Referring to FIG. 5C, driver a has felt weariness near the Uiwang research institute between 9 pm to 12 pm on a weekday, and in the instant case, the weather, the flow of traffic, and the Wangson lake adjacent to the Uiwang research institute serve as main factors that have caused weariness to driver a.

Driver b has felt weariness near the Uiwang research institute between 9 pm to 12 pm on a weekday, and in the instant case, the time, the flow of traffic, and the Wangson lake serve as main factors that have caused weariness to driver b.

Driver c has felt weariness near the Uiwang research institute between 9 pm to 12 pm on a weekday, and in the instant case, the temperature and the Wangson lake serve as main factors that have caused weariness to driver c.

Accordingly, the controller 160 determines that the flow of traffic and the Wangson lake are main factors of the weariness caused to the drivers near the Uiwang research institute between 9 pm to 12 pm on a weekday in common.

FIG. 6 is a diagram illustrating a method of classifying drivers having the same emotion as the user in the same place on the basis of travelling information, and extracting factors that exert influence on the emotions of the drivers according to another exemplary embodiment of the present invention.

The communicator 160 may receive travelling information related to other drivers at the Kangnam intersection from an external server. In detail, the communicator 160 may receive information related to emotions generated in a place, named the Kangnam intersection.

For example, referring to FIG. 6, the communicator 160 may receive information related to emotions, traffic situation, acceleration, traffic lights, weather, and the like from an external server.

As to describe the method with reference to drivers A to D, the communicator 160 may receive information related to drivers A to D who have felt different emotions in the Kangnam intersection. Among drivers A to D, drivers A, B, and C who have felt the same emotion of anger are classified into the same group, and in the instant case, traffic situation, acceleration information, and the number of traffic lights serve as main factors causing the anger.

Although the emotion state is described with reference to anger in FIG. 6, the emotion state according to an exemplary embodiment of the present invention is not limited thereto, and may include sadness, boredom, pleasure, irritation, weariness, and the like. The types of emotion are not limited thereto, and various emotions felt by human may be included in an exemplary embodiment of the present invention.

Furthermore, although the method is described with reference to a place in FIG. 6, drivers having felt the same emotion as the user may be classified not only based on a place but only based on a day of week or a time.

Furthermore, the factors which may cause emotions may include the traffic situation of a road, the type of a road, the number of traffic lights, the speed limit, the travelling speed of the vehicle, the weather, and the temperature.

Figure 8:
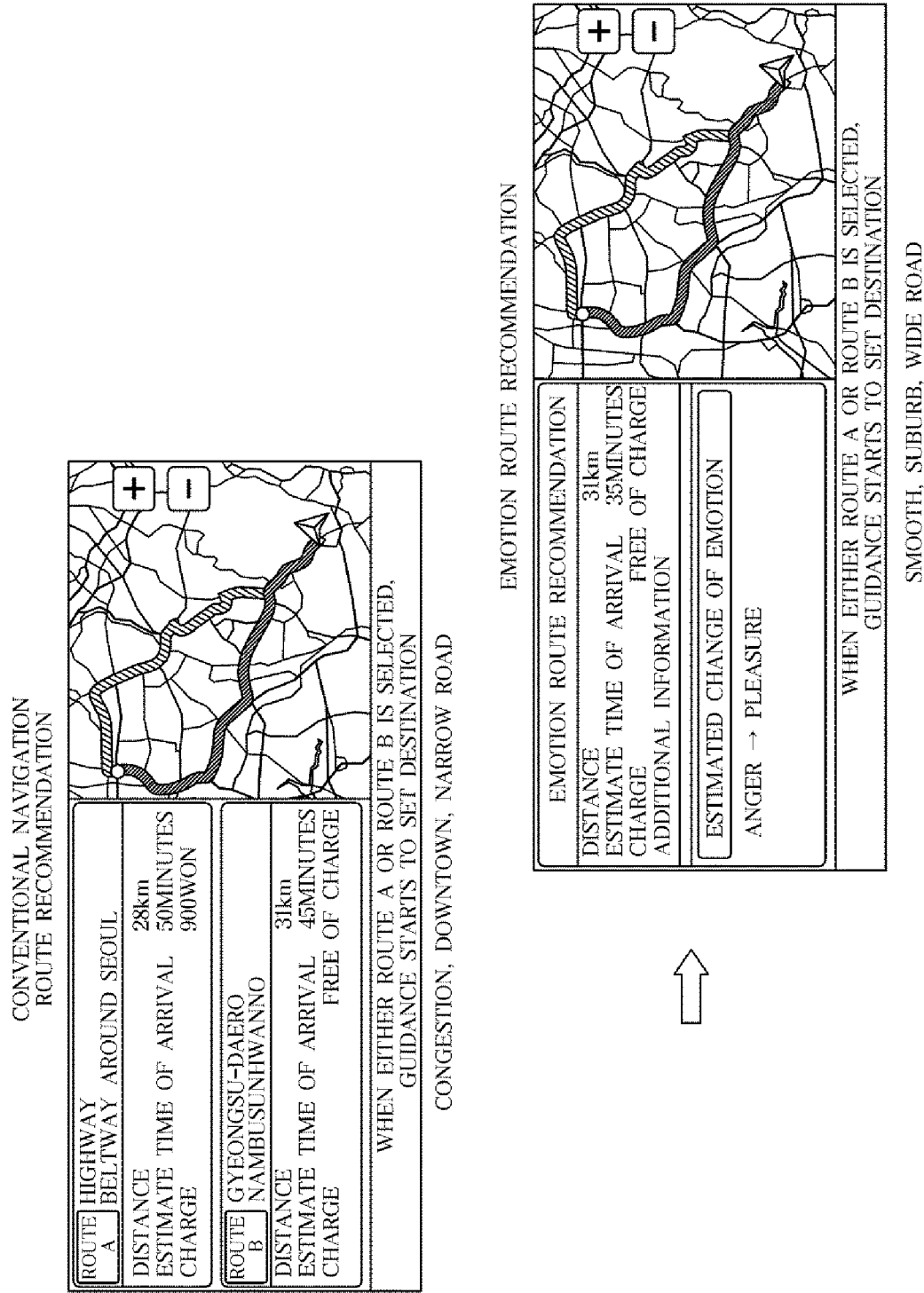
FIG. 8 is a diagram illustrating a result of the conventional route recommendation and a travel route generated according to an exemplary embodiment of the present invention.

FIG. 7 is a diagram illustrating information related to a travel route generated on the basis of a current emotion state of a driver according to an exemplary embodiment of the present invention, and FIG. 8 is a diagram illustrating a result of the conventional route recommendation and a result of the route recommendation of the vehicle 100 according to an exemplary embodiment of the present invention.

Referring to FIG. 7, the driver currently feels an anger, at the Gangnam intersection, and the cause of the anger is identified as heavy traffic congestion.

Accordingly, in the instant case, the controller 160 may generate a travel route toward a direction which may remove such a factor. In detail, currently, the Kyungbu Expressway has a smooth traffic situation, and thus travelling the Kyungbu Expressway may improve the emotion of the driver. Accordingly, the controller 160 generates a route for the driver to drive the Kyungbu Expressway, and displays the generated route on the display 170.

In other words, according to the conventional travel route providing technology, the user is only provided with a route having a shortest distance or shortest time on the basis of a destination.

However, the vehicle 100 according to the exemplary embodiment provides a route not only based on the destination but also based on the emotion state of the user toward a direction which may improve the emotion state of the user, so that the user may drive with pleasure.

In other words, referring to FIG. 8, the conventional technology provides only a route having a shortest distance or a minimum time to a destination, so that the user may be guided to an undesirable route having a congestion zone, a city driving, and a narrow road. However, the vehicle 100 according to the exemplary embodiment may provide a route which may convert the user's emotion from anger to pleasure.

Figure 9:
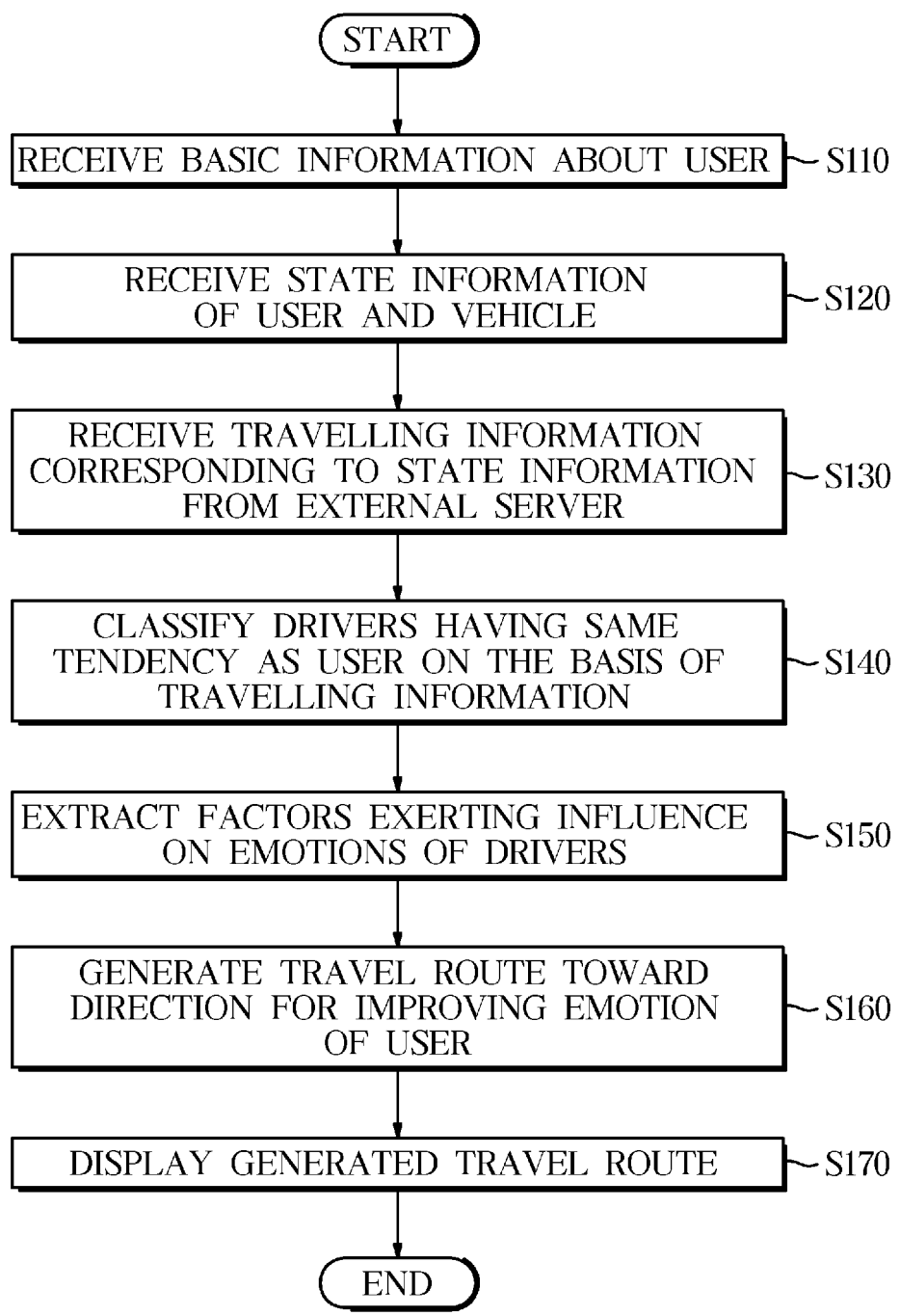
FIG. 9 is a flowchart showing a method of controlling a vehicle according to an exemplary embodiment of the present invention.

FIG. 9 is a flowchart showing a method of controlling the vehicle 100 according to an exemplary embodiment of the present invention.

Referring to FIG. 9, the vehicle 100 may receive information related to the user and state information related to the user and the vehicle 100 (S110 and S120).

The information related to the user may include information related to the user's body. For example, the information related to the user may include information related to at least one of sex, age, weight, and height, and such information may be input directly from the user.

The state information related to the user may include information related to the current emotion of the user, for example, anger, sadness, boredom, pleasure, and the like. Such information may be acquired through various sensors provided in the vehicle 100, or may be directly received through the inputter 120 from the user.

As such, the vehicle 100 may transmit the state information related to the user and the vehicle to the external server, and may receive travelling information related to the vehicle 100 corresponding to the state information from the external server (S130).

The travelling information may include emotion information felt by other drivers in a place in which the vehicle 100 is currently travelling and information associated with the emotion information.

The vehicle 100 may classify drivers having the same tendency as the user on the basis of the travelling information (S140), and extract factors exerting influence on the emotions of the drivers (S150).

In detail, the vehicle 100 may classify and group drivers having the same tendency as the user according to a predetermined criterion, and extract factors that exert influence on the emotions of the user on the basis of information related to the classified drivers. The predetermined criterion may include at least one of a time, a day of a week, a date, a season, a weather, and a current location of the vehicle.

The method of classifying drivers having the same tendency and the method of extracting factors exerting influence on the emotions of the drivers have been described above with reference to FIG. 5A, FIG. 5B and FIGS. 5C and 6, and details of parts identical to those described above will be omitted.

As such, the vehicle 100 may generate a travel route toward a direction which may improve the emotion of the user and display the generated route on the display 150 (S160 and S170).

The direction configured for improving the emotion of the user may be achieved such that factors exerting negative influence on the emotion of the user are removed, and when the current emotion state of the user is good, factors exerting the positive influence on the emotion of the user are maintained.

Figure 10:
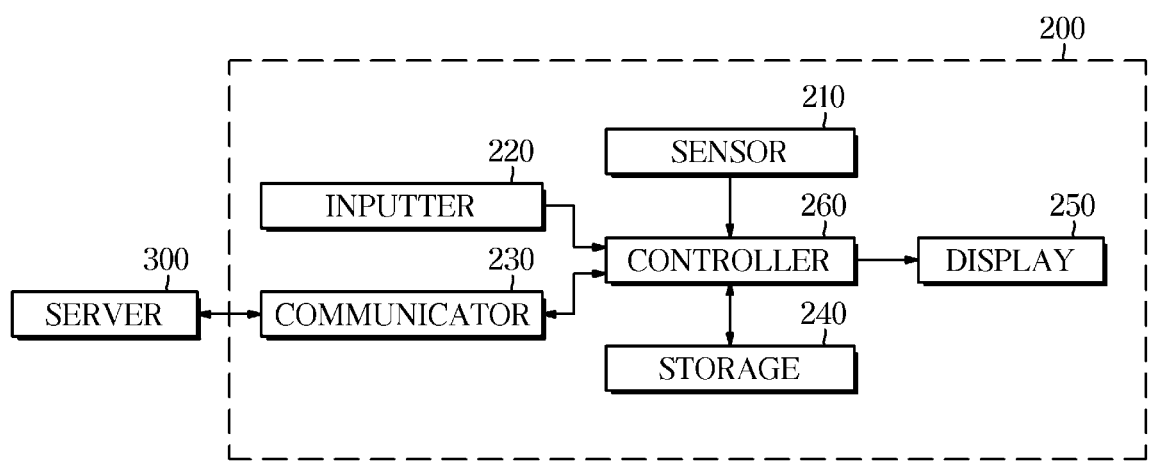
FIG. 10 is a block diagram illustrating a configuration of a vehicle system according to another exemplary embodiment of the present invention.

FIG. 10 is a block diagram illustrating a configuration of a vehicle system 10 according to another exemplary embodiment of the present invention.

Referring to FIG. 10, the vehicle system 1000 according an exemplary embodiment may include: a vehicle 200 including a sensor 210 for detecting and acquiring information related to a user, an inputter 220 for receiving the information related to the user, a communicator 230 for receiving information related to a travel route of the vehicle 200 from a server 300, a storage 240 for storing information related to the vehicle 200, a display 250 for displaying travelling information and a travel route of the vehicle 200, and a controller 260 for controlling various devices of the vehicle 200; and the server 300 for generating a travel route on the basis of the information received from the communicator 230 and transmitting the generated travel route to the communicator 230.

In the description of the vehicle system 1000, the sensor 210, the inputter 220, the communicator 230, the storage 240, and the display 250 are identical to the sensor 110, the inputter 120, the communicator 130, the storage 140, and the display 150 described above with reference to FIG. 3. and details of the parts identical to those described above will be omitted, and the following description will be made in relation to the server 300.

In the vehicle system 1000, the server 300 may generate a travel route on the basis of the information received from the communicator 230.

In detail, the server 300 may classify drivers having the same tendency on the basis of travelling information, generate a travel route of the vehicle 200 on the basis of an emotion state of the user and pieces of information related to the classified drivers, and transmit the generated travel route to the communicator 230.

The server 300 may receive traffic information related to other drivers from other vehicles, and store the received traffic information, and may classify and analyze the received pieces of information. Accordingly, the server 300 may classify drivers having the same tendency as the user on the basis of the received information related to the user and the other users according to a predetermined criterion, and may generate a travel route on the basis of information related to the classified drivers.

The server 300 may classify and group drivers having the same tendency as the user, and generate a travel route which may improve the emotion of the user on the basis of information related to the grouped drivers. The predetermined criterion may include at least one of a time, a day of a week, a date, weather, and the current location of the vehicle.

Furthermore, the server 300 may classify drivers having the same emotion as the user in the same place, extract factors exerting influence on the emotions of the drivers, and then generate a travel route toward a direction which may improve the emotion of the user.

The direction configured for improving the emotion of the user may be achieved such that factors exerting negative influence on the emotion of the user are removed, and when the current emotion state of the user is good, factors exerting the positive influence on the emotion of the user are maintained.

The method of classifying drivers having the same tendency and the method of extracting factors exerting influence on the emotions of the driver have been described above with reference to FIG. 5A, FIG. 5B and FIGS. 5C and 6, and details of parts identical to those described above will be omitted.

Figure 11:
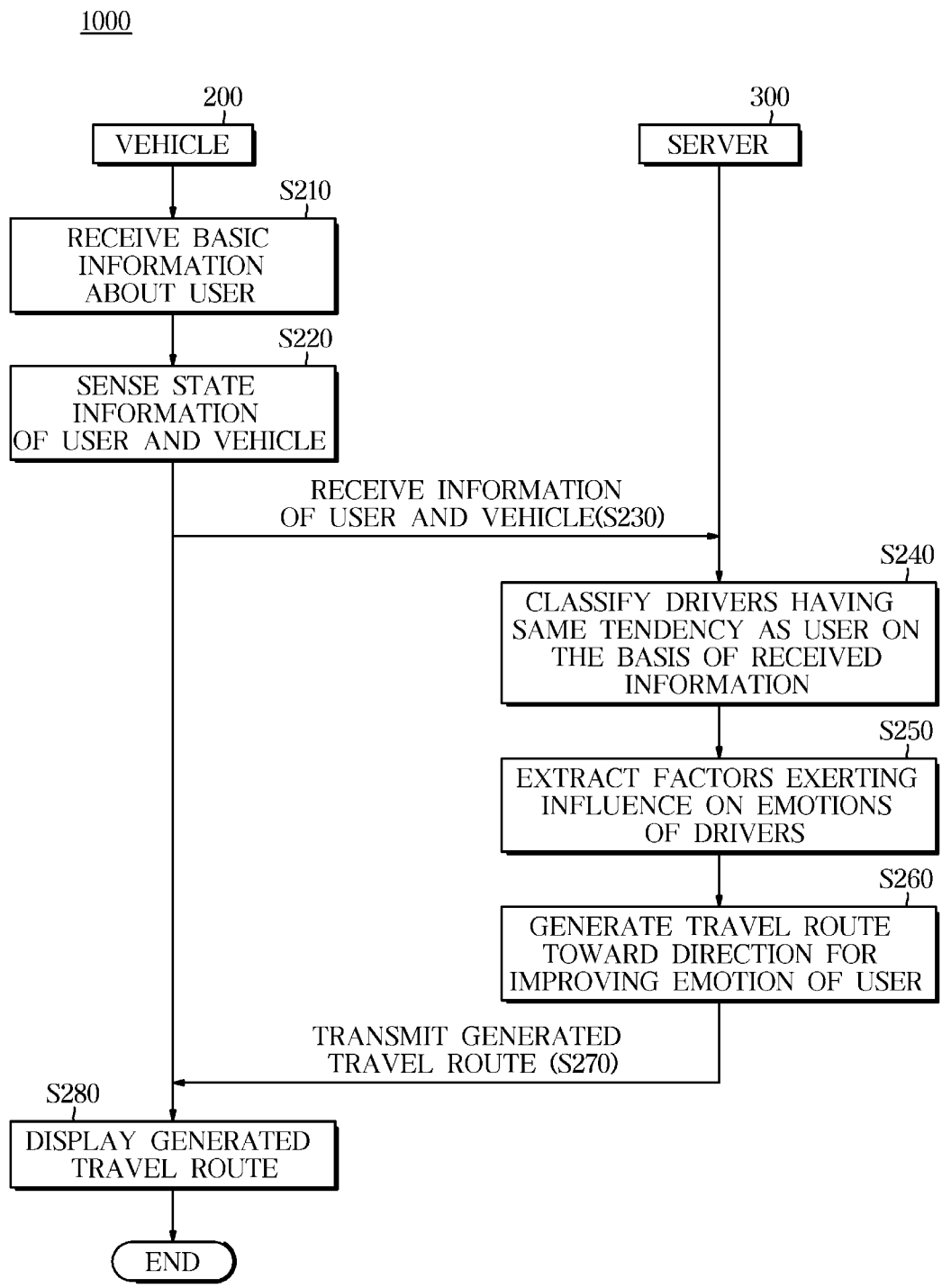
FIG. 11 is a flowchart showing a method of controlling a vehicle system according to another exemplary embodiment of the present invention.

FIG. 11 is a flowchart showing a method of controlling the vehicle system 1000 according to another exemplary embodiment of the present invention.

Referring to FIG. 11, the vehicle 200 may receive information related to the user and sense state information related to the user and the vehicle 200 (S210 and S220).

The vehicle 200 may transmit the detected state information related to the user and the vehicle to the server 300 (S230).

The server 300 having received the information from the vehicle 200 may classify drivers having the same tendency as the user on the basis of the received information, and extract factors that exert influence on the emotions of the drivers on the basis of information related to the classified drivers (S240 and S250).

In detail, the vehicle 100 may classify drivers by grouping drivers having the same tendency as the user according to a predetermined criterion, and extract factors that exert influence on the emotions of the user on the basis of information related to the classified drivers. The predetermined criterion may include at least one of a time, a day of a week, a date, a season, a weather, and a current location of the vehicle.

As such, the server 300 may generate a travel route toward a direction which may improve the emotion of the user and transmit the generated route to the vehicle 200 (S260 and S270).

The vehicle 200 having received the travel route from the server 300 may display the received travel route on the display 250 (S280).

In the above, the configuration and control method of the vehicle 100 and the vehicle system 1000 have been described.

The conventional route providing technology only provides the user with a route having a shortest distance or shortest time only based on a destination, without providing an emotion route corresponding to the emotion of the user.

However, the vehicle 100 and the vehicle system 1000 according to the exemplary embodiment provide a route toward a direction for improving the emotion state on the basis of the emotion state, rather than providing a route only based on a destination, so that the user may drive with pleasure.

As is apparent from the above, the vehicle and the vehicle system according to the exemplary embodiment can allow the user to drive with pleasure by providing the user with a route based on the user's emotional state toward a direction which may improve the emotional state in providing the user with the travel route, rather than providing a route based on the destination.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a sensor configured to detect state information related to a user and a vehicle;
   a transceiver configured to receive travelling information related to the vehicle corresponding to the state information from an external server;
   a controller connected to the sensor and the transceiver and configured to:
   classify drivers having a same tendency as the user on a basis of the travelling information;
   determine common state information that has caused an emotion state to the classified drivers having the same tendency, to be a main factor; and
   control at least one device provided in the vehicle on a basis of the emotion state, information related to the classified drivers, and the main factor to change the emotion state of the user; and a display connected to the controller, wherein the controller classifies the drivers having the same tendency as the user on the basis of the travelling information according to a predetermined criterion, wherein the predetermined criterion includes at least one of a time, a day of a week, a date, a season, a weather, and a current location of the vehicle, wherein the controller is configured to generate a travel route of the vehicle to improve the emotion state of the user, and to display the generated travel route on the display, and wherein the controller extracts at least one common factor that exerts influence on emotions of the classified drivers on a basis of the information related to the classified drivers, and generates the travel route on a basis of the at least one common factor.

2. The vehicle of claim 1, wherein the controller controls at least one of an audio, video, navigation (AVN) device, an air conditioning device, a vehicle sheet, and a window that are provided in the vehicle.

3. The vehicle of claim 1, wherein the controller classifies drivers who have a same emotion as the user in a same place on a basis of the travelling information, as the drivers who have the same tendency as the user.

4. The vehicle of claim 1, wherein the at least one factor includes at least one of a traffic situation of a road being travelled by the vehicle, a type of the road, and a travelling speed of the vehicle.

5. The vehicle of claim 1, further including an input device connected to the controller and configured to directly receive an emotion state of the user from the user.

6. The vehicle of claim 5, wherein the input device receives an input of the emotion state of the user through at least one of a text, a speech, and an emoticon.

7. The vehicle of claim 1, wherein, when the main factor to be improved exists, the controller is configured to control the main factor to be improved.

8. A vehicle system comprising:
a vehicle including:
a display configured to display a travel route of the vehicle;
a sensor configured to detect state information related to a user and the vehicle; and
a transceiver configured to transmit the state information to a server connected to the transceiver; and the server configured to classify drivers having a same tendency as the user on a basis of travelling information received from the vehicle, determine common state information that has caused an emotion state to the classified drivers having the same tendency to be a main factor, generate a travel route of the vehicle on a basis of the emotion state, information related to the classified drivers, and the main factor, and transmit the generated travel route to the vehicle, wherein the server classifies the drivers having the same tendency as the user on a basis of the state information according to a predetermined criterion, wherein the predetermined criterion includes at least one of a time, a day of a week, a date, a season, a weather, and a current location of the vehicle, wherein the server extracts at least one factor that exerts influence on emotions of the classified drivers on a basis of the information related to the classified drivers, and generates the travel route on a basis of the at least one factor, and wherein the server generates the travel route with a direction for removing the at least one factor.

9. The vehicle system of claim 8, wherein the server classifies drivers who have a same emotion as the user in a same place on a basis of the state information, as the drivers who have the same tendency as the user.

10. The vehicle system of claim 8, wherein the at least one factor includes at least one of a traffic situation of a road being travelled by the vehicle, a type of the road, and a travelling speed of the vehicle.

11. The vehicle system of claim 8, wherein the server generates the travel route toward a direction for changing a current emotion state of the user.

12. The vehicle system of claim 8, wherein the vehicle further includes an input device configured to directly receive an input of an emotion state of the user from the user.

13. The vehicle system of claim 12, wherein the input device receives an input of the emotion state of the user through at least one of a text, a speech, and an emoticon.

14. The vehicle system of claim 8, wherein, when the main factor to be improved exists, the vehicle, controls the main factor to be improved.

* * * * *